United States Patent Office 2,921,057
Patented Jan. 12, 1960

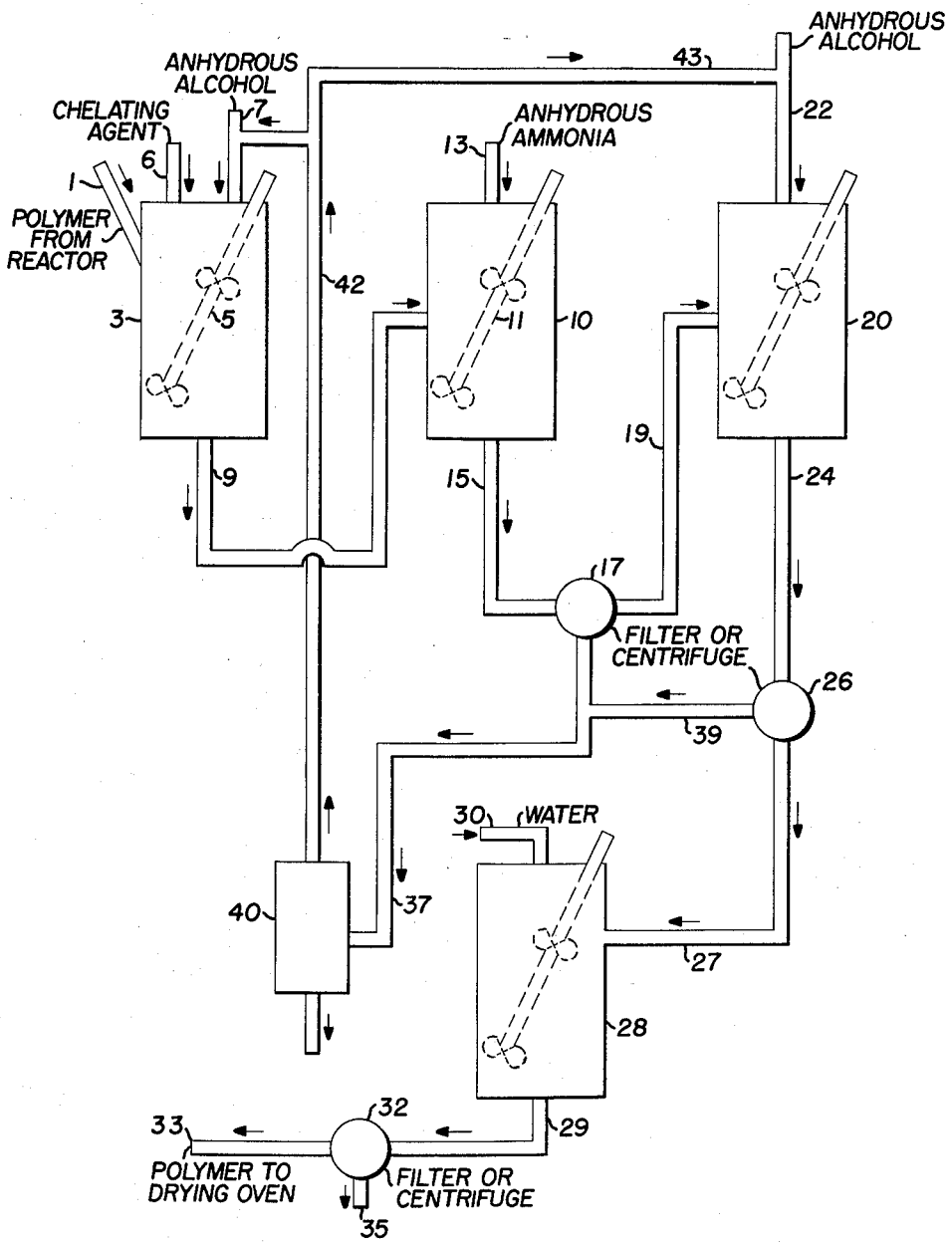

2,921,057

REMOVAL OF METAL CONTAMINANTS FROM POLYMERS

Joseph Kern Mertzweiller, Baton Rouge, La., assignor to Esso Research and Engineering Company, a corporation of Delaware Application March 29, 1957, Serial No. 649,441

5 Claims. (Cl. 260—93.7)

This invention relates to polymerization and more particularly relates to a novel method for removing metal contaminants from polymeric products.

The art is well familiar with the preparation and uses of a wide variety of polymeric products. More specifically, polymeric products are used for plastics, film-forming materials, tires, lubricant additives and the like. Many of these polymeric products are prepared employing metal compounds as catalysts in the polymerization reaction. In most cases it is highly desirable to prepare a polymeric product having a low metal content. For example, the presence of metals (or ash-forming ingredients) unfavorably affect the electrical properties and color of the polymeric products.

Recently a new method has been developed for preparing polymeric products wherein monomers are polymerized in the presence of a catalyst obtained by mixing a reducing metal compound (e.g., aluminum trialkyl or dialkyl aluminum chloride) with a reducible metal compound (e.g., titanium tetrachloride). This process has been found to be both economical and effective. A serious problem encountered in this process is the presence of a relatively high proportion of metal contaminants in the final polymeric products. Conventional polymer purification techniques have been generally unsuccessful in reducing the proportion of metal contaminants or ash-forming ingredients below the levels desired for good color and good electrical properties. Thus the finding of a method for reducing the proportion of metal contaminants in the polymeric products prepared by this method is essential to its commercial success in a number of fields of application.

Prior to the present invention residual catalyst has been removed from solid polymers of the type just described by washing the polymer with a low molecular weight alcohol such as butanol or isopropanol. By this method the residual catalyst metals are converted into soluble alcoholates which may be readily separated from the polymer by filtration and alcohol washing. However, in the course of the metal alcoholate formation hydrogen halide acids are formed from the halogen present in the original catalyst. This leads to equipment corrosion and to contamination of the polymer product with iron or other undesirable materials dissolved from the equipment walls, unless expensive corrosion resistant alloys are used.

The present invention overcomes this difficulty and affords various additional advantages as will appear more clearly from the subsequent description of the invention wherein reference will be made to the accompanying drawing the single figure of which is a schematic flow plan of a system adapted to carry out an embodiment of the invention.

It has now been found that polymeric products containing metal contaminants or ash-forming ingredients of the type specified above may be effectively purified without appreciable equipment corrosion by mixing the polymer, and thus quenching the catalyst, with at least sufficient low molecular weight alcohol to convert all metals contaminants to alcoholates and thereafter adding a sufficient amount of ammonia particularly anhydrous ammonia to the mixture at least to neutralize the slurry. The amount of alcohol is preferably kept at a stoichiometric excess of at least 200% relative to catalyst residues. If a substantial proportion of desired polymerization product is soluble in the polymerization medium, for example in the polymerization of propylene and higher alpha olefins, it is preferred to use sufficient alcohol to precipitate the dissolved polymer. For example, alcohol amounts of about 100–200%, based on inert diluent, may be employed. The amount of ammonia should exceed that required for neutralization by not more than, say, about 5 to 20%, to avoid the formation of metal hydroxides. Also, air or oxygen should be carefully excluded during the quenching and neutralization stages to prevent the formation of insoluble metal compounds.

An essential element of this invention is the order and means of contacting the polymer slurry with the alcohol and ammonia. The slurry from the polymerization reactor must be contacted with the alcohol before contacting with ammonia. This is essential to achieve good ash removal. The first contacting with alcohol is preferably carried out in a relatively small, highly agitated vessel which is preferably glass lined or constructed of an acid resistant alloy. The retention time in this vessel should be sufficient to convert the major portion of the metallic residue to alcoholates; with effective high shear agitation a contact time of 5–15 minutes at temperatures of 40°–80° C. is sufficient. This treatment may be carried out in two or more staged reactors if maximum degree of ash removal is desired. Also chelating agents such as beta di-ketones, esters or acids may be added in slight stoichiometric excess over the catalyst residues to facilitate ash removal. The ammonia is then added to the slurry, preferably in the transer line from the alcohol treating vessel.

After neutralization, the mixture may be filtered and the polymer may be further extracted with anhydrous alcohol in staged or countercurrent operation. After this extraction treatment, the polymer may be washed with hot or cold water to remove the ammonium compounds such as ammonium halides formed in the neutralization stage. Finally, the product polymer may be dried by heating.

The process of the invention results in highly efficient ash removal with minimum contamination of the polymer with iron or other acid soluble constituents of the equipment walls. Accordingly, inexpensive carbon steel may be used in place of expensive corrosion resistant alloys in the major portion of the washing stages of the polymer work-up system. Also, anhydrous ammonia has the advantage of avoiding catalyst precipitation in forms insoluble in the alcohol used in subsequent washing stages. Ammonia addition, therefore, need not be closely controlled.

The alcohols used in the quenching and extraction stages of the invention are aliphatic monohydric alcohols having 1–5 carbon atoms. Suitable examples include methyl, ethyl, propyl, butyl and amyl alcohols. Water soluble alcohols and particularly isopropyl alcohol and normal butyl alcohol are preferred. It is desirable, to hold the water content of the alcohol used to a minimum, e.g., below 0.1%.

As stated above, the present invention has been found to be particularly effective in removing metal contaminants or ash-forming ingredients from polymeric materials produced by polymerizing monomers in the presence of a catalyst obtained by mixing a reducing metal compound with a reducible metal compound.

The catalyst employed in this type of polymerization reaction is formed simply by mixing a metal or metal compound, having reducing properties such as alkali, alkaline earth or earth metal, their alloys, hydrides or organic compounds, etc. with a reducible metal compound in the presence of an inert liquid diluent such as paraffinic hydrocarbons having 4-8 carbon atoms, high molecular weight essentially paraffinic hydrocarbon mixtures, such as white oil, alkylate bottoms, etc., certain aromatic hydrocarbons such as toluene, xylene, monochlorobenzene, etc. The metal compound having reducing properties is preferably an aluminum hydride or organo-aluminum compound such as aluminum dialkyls or diaryls or aluminum trialkyls or triaryls. Specific examples of such aluminum compounds include triethyl, aluminum trimethyl, aluminum tri-isopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, these aluminum compounds have the general formula

where R and R' are members selected from the group consisting of hydrogen, alkyl radicals and aryl radicals and X is a member selected from the group consisting of hydrogen, halogen atoms, alkoxy radicals, aryloxy radicals, secondary amino radicals, secondary acid amide radicals, mercapto radicals, thiophenol radicals, radicals or carboxylic acids and radicals of sulfonic acids. The most commonly used aluminum compounds are (1) dialkyl aluminum monohalides containing about 2 to 4 carbon atoms in the alkyl groups and chlorine or bromine atoms, particularly chlorine atoms, and (2) aluminum trialkyls containing about 2 to 4 carbon atoms in the alkyl groups.

The reducible metal compound is generally one of a transition metal of groups IV-VIII of the periodic system of elements. Examples of such elements include titanium, zirconium, hafnium, thorium, uranium, vanadium, columbium, tantalum, chromium, molybdenum and tungsten. Copper may also be used. Examples of the compounds of these metals which may be used include halides such as chlorides or bromides, oxy halides such as oxychlorides, freshly precipitated oxides or hydroxides, organic compounds such as alcoholates, acetates, benzoates or acetyl acetonates. The most commonly used salts are those of titanium, zirconium, thorium, uranium and chromium. Titanium salts are particularly useful, such as titanium chlorides, particularly titanium trichloride and titanium tetrachloride, titanium oxychloride or titanium acetyl acetonate.

As stated above, the catalyst mixture is prepared simply by mixing the metal-containing material having reducing properties with the reducible heavy metal compound in the presence of an inert liquid diluent. Generally the molar ratio of the reducing metal compound to the reducible metal compound is in the range of about 1:3 to 12:1, more preferably about 1:2 to 3:1. The catalyst mixture is prepared generally using an inert liquid diluent in an amount sufficient to form a mixture containing about 0.2 to 25.0 weight percent of the catalyst components, and employing mixing temperatures in the range of about —20 to 150° F. and mixing times of about 5 minutes to 24 hours. The optimum conditions for preparing the catalyst depend in large measure on the particular aluminum alkyl used as the reducing agent. For example, aluminum triethyl can be employed using relatively low concentrations and temperatures to form an active catalyst. On the other hand, when using aluminum diethyl chloride at approximately .5 weight percent concentration, heating times of about 15 to 30 minutes at temperatures of about 120° to 140° F. give the most active catalyst. When the two catalyst components are mixed in the presence of the inert liquid diluent, a precipitate is generally formed which is insoluble in the inert liquid diluent.

A wide variety of polymeric products can be prepared by employing the above-described catalyst mixtures of a reducing metal material with a reducible metal compound. These catalysts are particularly effective for polymerizing ethylene but are also effective for preparing other homopolymers or copolymers, particularly those of hydrocarbon monomers. For example, polymers of propylene and higher alpha olefins, polymers of diolefins and copolymers of these olefins can be prepared by this polymerization method.

Generally an inert liquid diluent of the type specified above will also be employed in the polymerization process to facilitate the polymerization reaction. The amount of the inert liquid diluent employed in the polymerization process should be such that the final polymeric product in the reaction mixture does not exceed about 40 weight percent so that a relatively fluid reaction mixture is produced. Generally the amount of inert diluent is such that the polymeric product in the final reaction mixture is in the range of about 1% to 25% by weight. The proportion of catalyst, based on the inert liquid diluent, will generally be in the range of about 0.05 to 0.5 weight percent, usually about 0.1 to 0.3 weight percent.

The polymerization reaction conditions, that is, time, temperature and pressure, are adjusted to produce polymers or copolymers having molecular weights generally of at least about 2,000, usually at least about 10,000. Polymeric products having molecular weights up to 2,000,000 to 5,000,000 or higher may be prepared. Generally, temperatures in the range of about —40 to 200° C., usually about 20° to 80° C., are employed. Higher temperatures can be employed if desired, but temperatures above about 250° C. are undesirable generally since the catalyst decomposes to a considerable extent at this temperature. In general, pressures in the range of about 1 to 250 atmospheres or higher are employed. If desired, subatmospheric pressures can be employed with certain monomers. The polymerization of ethylene can be carried out conveniently by employing pressures of about 1 to 10 atmospheres. An advantage of this process is that relatively low pressures can be employed. In order to obtain polymeric products having molecular weights above about 2,000, a polymerization reaction time of at least about 15 minutes will be required. Generally, polymerization reaction times in the range of about 15 minutes to 24 hours, usually about 2 to 6 hours, will be employed.

Upon completion of the polymerization reaction, the polymeric product is washed with alcohols, neutralized with ammonia in accordance with this invention and then further washed, if desired, and dried by heating. Generally these polymeric products will contain about 0.005 to 0.05, usually about 0.01 to 0.02 by weight of ash as determined by an analysis for metals from which the ash content is calculated.

It will be understood that although the present invention is particularly applicable to olefin polymers prepared by employing as a polymerization catalyst a mixture of a reducing metal-containing material with a reducible metal compound, the present invention is applicable generally to polymeric products prepared by any known method which contain undesirable metal contaminants.

A system suitable for the purification of "plastics" type low pressure polyethylene or similar polymers of the type described above is shown in the drawing. Referring now to the drawing a polymer slurry of solid polyethylene or the like in an inert reaction diluent of the type described above such as n-heptane is passed from the polymerization reactor (not shown) via line 1 to alcohol quneching vessel 3 provided with a conventional stirring mechanism 5. The polymer slurry may contain about 5 to 20% of solid polymer and about 0.05 to 0.3 wt. percent of alkyl aluminum halide-titanium halide catalyst having an Al/Ti ratio of about 0.2/1 to 2/1.

Anhydrous alcohol, such as anhydrous isopropanol is supplied to vessel 3 via line 7 in amounts corresponding to about 2-3 times the amount required to convert all aluminum and titanium present into alcoholates. About 100 to 200% based on inert hydrocarbon diluent of anhydrous isopropanol is normally sufficient for this purpose. If desired about 0.1-5 wt. percent of a chelating agent of the type described above, such as acetyl acetone, may be added via line 6 to zone 3. Vessel 3 is so dimensioned that a reaction time of about 5 to 15 minutes is provided therein at a temperature of 40-80° C.

The quenched slurry leaving vessel 3 via line 9 is passed to neutralization vessel 10 provided with stirrer 11. Anhydrous ammonia is supplied to vessel 10 via line 13 to neutralize the acid liberated in vessel 3. About 1.05 to 1.2 mols of $NH_3$ per mole of chloride in its catalyst charge is sufficient for this purpose. Vessel 10 may provide approximately the same residence time as vessel 3.

The neutralized slurry is withdrawn via line 15 and subjected to filtration or centrifuging in separation zone 17. Separated solids, preferably in the form of a pumpable slurry are passed via line 19 to an extraction stage schematically illustrated by zone 20. This zone may be representative of a conventional countercurrent extraction tower or of a plurality of batch extraction stages arranged in series. In either case anhydrous alcohol of the type specified above is used as the principal extraction medium applied to zone 20 via line 22. About 200 to 400% of alcohol based on polymer may be used in this zone.

The extracted polymer leaving zone 20 via line 24 is again filtered or centrifuged in separation zone 26 and the polymer concentrate is conveyed via line 27 to water washing stage 28 which may be of similar design as zone 20, water being supplied via line 30. The water washed polymer withdrawn through line 29 is finally separated from liquid in zone 32 by filtration or centrifuging and passed to drying via line 33. Used wash liquid is removed via line 35 and may be treated for ammonium halide recovery in any conventional manner.

Used alcohol may be recovered from the various filtrates by conventional means such as fractionation. For this purpose, the liquids separated in zones 17 and 26 may be passed via lines 37 and 39, respectively, to a fractionator 40 or the like from which alcohol may be returned via lines 42 and 43 to vessels 3 and 20 respectively.

The system illustrated in the drawing permits of various modifications which will appear to those skilled in the art without deviation from the spirit of the invention. For example, in certain cases organic derivatives of ammonia such as pyridine, certain aliphatic amines, etc., particularly watersoluble derivatives which are readily removed from the polymer may show some of the effects of ammonia.

Example I

A 1 quart sample of polymer (mol. wt. about 40,000) slurry was withdrawn from a large scale batch polymerization of ethylene with diethyl aluminum chloride—$TiCl_4$ catalyst. This polymerization was carried out in a 400°-500° F. fraction of acid-treated light gas oil. The polymerization took place at about 0.6 Al/Ti mol ratio, a temperature of 150° F. and substantially atmospheric pressure. The slurry contained about 11 wt. percent of polymer and about 0.5 wt. percent of total catalyst based on hydrocarbon diluent, i.e. about 4.5 wt. percent of catalyst based on polymer. After quenching the catalyst with an excess of n-butanol, amounting to about 25-30 vol. percent based on hydrocarbon diluent, the total slurry was treated with anhydrous ammonia at room temperature by bubbling the ammonia through the slurry for about 5 minutes until the mixture was strongly alkaline to phenolphthalein. Approximately an equal volume of n-butanol was added to the ammonia-treated slurry and the mixture remained alkaline. A sample was filtered and washed on the filter with butanol. A second sample was filtered free of liquid and given a second stage butanol wash at about 190° F. and in the presence of about 2% acetyl acetone in the butanol. The samples were then washed on the filter with water until all alcohol was removed. Thereafter the samples were dried over-night in a warm oven at about 70° C.

Analyses obtained on the principal ash components for these ammonia-treated products are compared below:

| Washed in | Laboratory Glass Equipment | | | Pilot Plant (Carbon Steel) |
| --- | --- | --- | --- | --- |
| Sample | $NH_3$ Treated; No Wash | $NH_3$ Treated; Butanol Wash | $NH_3$ Treated; Butanol+ Acetyl Acetone Wash | No $NH_3$ Treat; Butanol+ Acetyl Acetone Wash |
| Aluminum, Wt. Percent (based on Polymer) | 0.017 | 0.006 | 0.002 | 0.004 |
| Titanium, Wt. Percent (based on Polymer) | 0.062 | 0.010 | 0.002 | 0.002 |
| Iron, Wt. Percent (based on Polymer) | 0.012 | 0.002 | 0.001 | 0.028 |

These data show the ammonia neutralization does not decrease the effectiveness of subsequent washing with chelating agents and excellent product quality is obtained. The high iron content of the polymer washed in the pilot plant carbon steel equipment is due to the corrosive nature of the butanol quenched polymer slurry. This liquid is strongly acidic when not subjected to the ammonia neutralization. Titration of a sample of the liquid phase showed an acid content (as HCl) equivalent to the total chloride charged with the diethyl aluminum chloride and titanium tetrachloride catalyst components.

The great advantage of the ammonia neutralization step is to eliminate this acidity and permit adequate washing of polymer in carbon steel equipment compared to much more expensive alloy steel equipment. Also anhydrous ammonia has the advantage that when used under the preferred conditions described above it does not precipitate the catalyst residues in forms that cannot be solubilized in subsequent alcohol washes. Thus, close control of the ammonia addition is not necessary.

Example II

In comparison with the results given in Example I, the following data show that precipitation of the ash components in the polymer results if the polymer slurry is treated with ammonia or amines prior to, or during, the first alcohol treatment. The method of preparing the polymer slurry and alcohol treating was essentially identical with that described in Example I.

| Base Added | Method of Addition | Total Ash Content of Polymer, Wt. Percent |
| --- | --- | --- |
| Pyridine | Simultaneously with n-butanol | 0.03 |
| None | n-butanol control | 0.006 |
| Anhyd. $NH_3$ | Direct to slurry before washing | 0.82 |
| None | n-butanol control | 0.07-0.2 |

The invention is not to be limited to the specific numerical values given in the above examples but only by the definitions of the appended claims.

What is claimed is:

1. In the method of removing ash constituents from a solid, alpha olefin, hydrocarbon, high molecular weight polymer containing residues of a catalyst obtained by mixing an aluminum alkyl with a halide of the group consisting of the group IV–B, V–B and VI–B metals of the periodic system wherein said residue-containing polymer is treated with a $C_1$ to $C_5$ aliphatic alcohol containing no more than 0.1 wt. percent water, the improvement which comprises first treating said residue-containing polymer in the absence of oxygen with a stoichiometric excess of said alcohol relative to said residues at a temperature of about 40°–80° C. for about 5–15 minutes while stirring, then neutralizing the alcohol-treated polymer in the absence of oxygen with an amount of anhydrous ammonia exceeding that needed for neutralization by not more than 5–20%, separating polymer from the neutralized slurry formed and water washing from the separated polymer ammonium compounds formed during neutralization.

2. The method of claim 1 in which said separated polymer is further extracted with a $C_1$ to $C_5$ aliphatic alcohol.

3. The method of claim 1 in which the polymer is also contacted with a beta diketone during the first, alcohol treating step.

4. The method of claim 1 in which said polymer is selected from the group consisting of polyethylene and polypropylene.

5. The method of removing ash constituents from a solid, alpha olefin, hydrocarbon, high molecular weight polymer which comprises first stirring a polymer slurry containing about 5–20% of solid polymer dispersed in an inert liquid hydrocarbon diluent and about 0.05–0.3 wt. percent of an alkyl aluminum and titanium halide-containing catalyst having an Al/Ti ratio of about 0.2–2.0 with an anhydrous aliphatic monohydric alcohol having 1–5 carbon atoms in an amount corresponding to about 2–3 times that required to convert all aluminum and titanium present into alcoholates, then stirring the slurry so treated with about 1.05–1.2 mols of anhydrous ammonia per mole of chloride in said catalyst, separating solid polymer in the form of a pumpable slurry from the slurry so treated, further extracting said pumpable slurry with about 200–400% of said alcohol based on polymer, concentrating solid polymer from the extracted slurry, water-washing the polymer concentrate to remove ammonium halide therefrom, and drying the water-washed polymer.

References Cited in the file of this patent
UNITED STATES PATENTS

| | | |
|---|---|---|
| 1,939,932 | Thomas | Dec. 19, 1933 |
| 2,287,535 | Powers | June 23, 1942 |
| 2,474,671 | Hersberger | June 28, 1949 |

FOREIGN PATENTS

| | | |
|---|---|---|
| 533,362 | Belgium | May 16, 1955 |
| 538,782 | Belgium | Dec. 6, 1955 |

OTHER REFERENCES

Noller: "Chemistry of Organic Compounds," 2nd edition, Saunders Company (Philadelphia, 1957), pages 771, 772.